UNITED STATES PATENT OFFICE.

HERMANN SCHUDT, OF CHARLOTTENBURG, GERMANY.

METHOD OF PRODUCING PLASTIC COMPOSITION.

No. 873,960.  Specification of Letters Patent.  Patented Dec. 17, 1907.

Application filed April 8, 1907. Serial No. 366,923.

*To all whom it may concern:*

Be it known that I, HERMANN SCHUDT, a subject of the King of Prussia, and resident of 57 Schlüterstrasse, Charlottenburg, near Berlin, German Empire, have invented a Method of Producing Plastic Composition, of which the following is an exact specification.

My invention relates to a method of producing a plastic composition designed to be employed for applying stucco to walls, ceilings and the like or for insulating, impregnating or the like purposes.

With compositions as hitherto used for this purpose, it is necessary to roughen the base or ground thereby causing damage to drawings limiting the outlines of the stucco figures and the like. Furthermore it is known, that the usual materials for applying purposes, which consist mostly of lime, emery and gypsum, adhere only to a roughened base, but not, as often required, on grounds of different natures or on plain grounds. Again the known material hitherto used by sculptors for shaping or molding purposes is unsuitable for impregnating fabrics.

Now my invention has for its object, to provide a material to overcome all these defects, and to this end, infusorial earth and a solution of glue is so mixed as to form a very sticky paste or mass. Linseed oil is then heated and mixed with molten resin, and the following are the proportions which have been found to be suitable, viz:—1½ liters of linseed oil and 150 grams of molten resin to 10 kilograms of infusorial earth. The linseed oil and resin while in a heated state is incorporated with the mixture of infusorial earth and glue and worked into a uniform composition, a strong solution of soap-water then being added to this composition which is thereby rendered suitable for modeling purposes or for impregnating tissues or cords. The binding power of the composition is in no way diminished however by the addition of soap-water, as hereinbefore stated. The composition is now mixed with finely cut tow and passed through a mill after which the finished composition is stored up in suitable air-tight vessels. It may be observed that in practice, the plastic mass obtained as hereinbefore described, for impregnating fabrics, must be of a thicker or thinner consistency according to the particular requirements.

A considerable advantage of this composition over the known materials for applying stucco, lies in the fact that the latter requires to be freshly prepared for each application, whereas my new composition, remains fresh and useful in the closed vessel for a very long period, for instance for several years. When applied, the composition congeals after a very short time without alteration in its volume as for example, by shrinkage. It combines directly with any plastering on ceilings or on walls, which latter require no roughening, while the new composition also adheres to wood and metal, for instance, iron girders; also to burnt clay, such as vases or furnaces to be decorated; and to marble and glass. The latter property is of especial value in framing and bordering mirrors and mosaics of glass, the material adhering to glass as well as to plastering.

The material can advantageously be used for lining purposes as for instance in the insulating of conduits through which warm or cold mediums pass. The lining is carried out by coating the conduit with the composition and forming a layer of more or less thickness thereof on the conduit. The mass adheres without requiring any fastening means to the conduit and dries without becoming cracked, and thus forms a very rigid covering, resisting heat and atmospheric influences. The surrounding of the conduit, as hitherto usual, with strips of cloth liable to catch fire and expensive is thus perfectly avoided.

Having thus fully described the nature of my invention, what I desire to secure by Letters Patent of the United States is:—

1. A method of producing plastic composition, designed to be employed for applying stucco, or for insulating and impregnating purposes and the like, consisting in forming a sticky paste of infusorial earth and glue, mixing with this paste heated oil and resin, and adding to the mixture thus produced a strong solution of soap.

2. A method of producing plastic composition, designed to be employed for applying stucco or for insulating and impregnating purposes and the like, consisting in forming a sticky paste of infusorial earth and glue, mixing with this paste heated oil and resin, adding to the mixture a strong solution of soap and introducing tow in the mixture thus obtained.

In witness whereof I have hereunto set my hand in the presence of two witnesses.

HERMANN SCHUDT.

Witnesses:
 HENRY HASPER,
 WOLDEMAR HAUPT